May 26, 1970  R. E. WIGGERMAN  3,514,620
EXPANDABLE ELECTRO-OPTICAL HEIGHT SENSOR
Filed Dec. 15, 1967  3 Sheets-Sheet 1
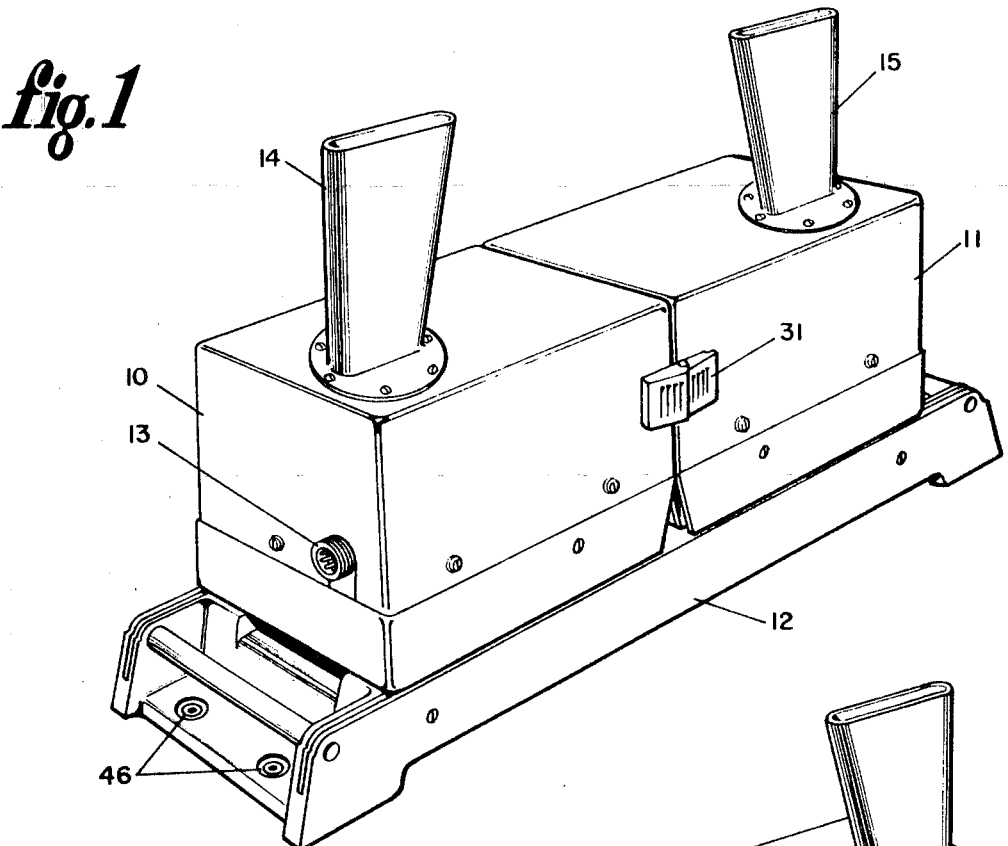
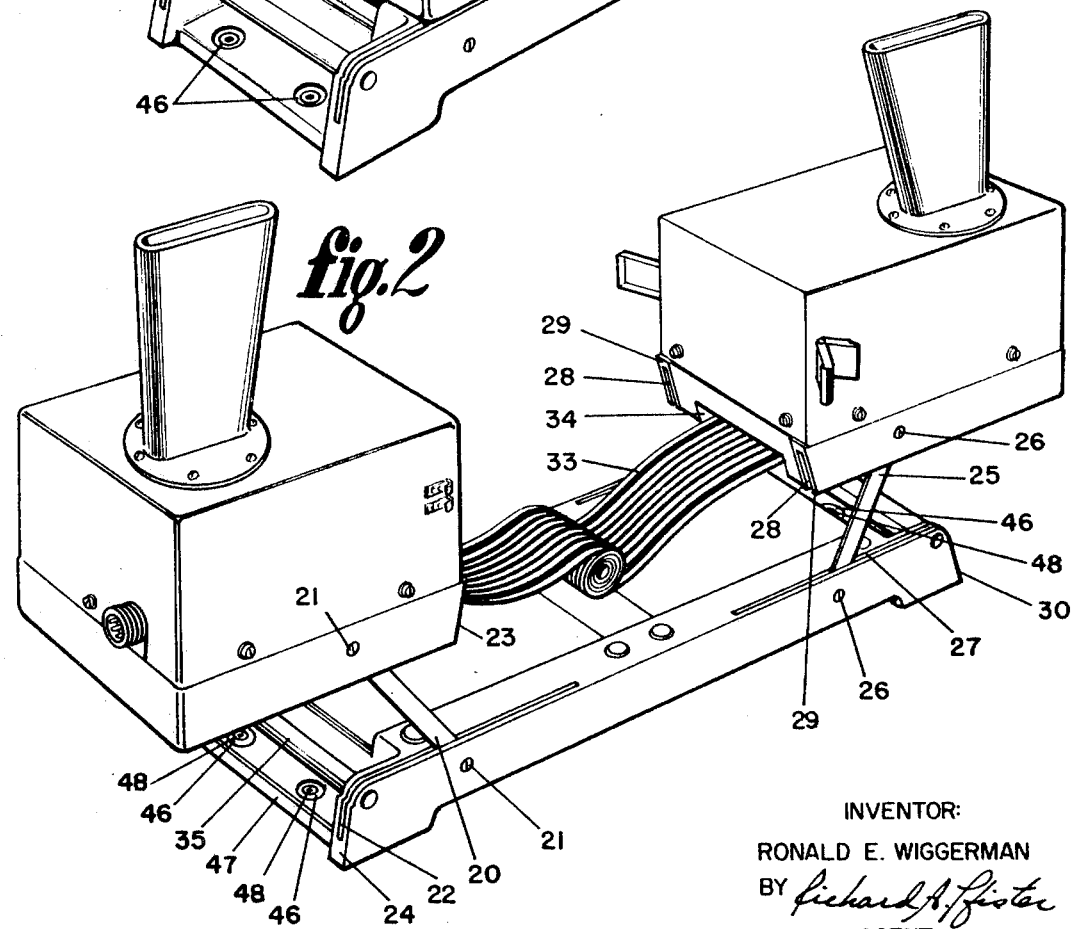
INVENTOR:
RONALD E. WIGGERMAN
BY
AGENT May 26, 1970  R. E. WIGGERMAN  3,514,620
EXPANDABLE ELECTRO-OPTICAL HEIGHT SENSOR
Filed Dec. 15, 1967  3 Sheets-Sheet 2

INVENTOR:
RONALD E. WIGGERMAN
BY
AGENT

INVENTOR:
RONALD E. WIGGERMAN
BY
AGENT

United States Patent Office 3,514,620
Patented May 26, 1970

3,514,620
EXPANDABLE ELECTRO-OPTICAL HEIGHT SENSOR
Ronald E. Wiggerman, McHenry, Ill., assignor to Chicago Aerial Industries, Inc., Lake County, Ill., a corporation of Delaware
Filed Dec. 15, 1967, Ser. No. 691,025
Int. Cl. H01j 5/02, 39/12
U.S. Cl. 250—239                                    5 Claims

ABSTRACT OF THE DISCLOSURE

An expandable electro-optical pickup unit that allows variation of the in-line separation of the sensing elements of a multiple sensor detecting device. Expansion is achieved by means of parallel arm hinges that swing the sensors in opposite directions away from a base member while retaining control of their relative spacing and alignment.

BACKGROUND OF THE INVENTION

This invention relates to multiple sensor detecting devices and particularly to those employing two or more specifically positioned energy beams adapted to be interrupted by the passage of the objects to be detected or measured. Typical of such devices are the parallax interval sensing devices described in detail in U.S. Pats. Nos. 2,960,908 and 3,002,420 issued to Willets et al., and assigned to the same assignee as this application.

In the above cited mechanisms, the sensing elements are employed to detect the interruptions of light beams as an opaque object passes through them. Two of the light beams are arranged to cross one another at a point in space, thus forming an angle between themselves. The value of this angle is then instrumental in computing the distance of the object from the detector. However, due to the nature of the computations, it is necessary that the size of the angle be kept small and within prescribed limits. Morever, the accuracy of measurement of the detecting device requires that the crossover point of the light beams be maintained in close proximity to the object being measured. Therefore, it is apparent that the maximum distance at which the detecting device can be usefully employed is dictated by the minimum size that the angle between the light beams is allowed to assume since that angle size places the crossover point of the beams a the farthest distance from the detector. Conversely, the largest allowable angle determines the least possible object-to-detector distance.

With a limitation on the minimum size that the angle between the light beams may assume, the only way to increase the maximum object-to-detector distance is to increase the spacing between the beam emitting soruces which coincide in position with the sensor elements.

It is an object of the present invention to provide an improved parallax interval sensing device having an increased useful range of measurement.

It is an important object of this invention to increase the utility of a parralax interval sensing device by providing linearly expandable sensor containing means.

It is another object of this invention to provide a remote multi-sensor pickup unit in which the sensors may be linearly separated without being detached from the unit.

It is a further object of this invention to provide a compact expandable sensor holding device which can operate as a remote detecting unit in conjunction with an instrument for measuring the spatial separation between a reference plane and each of a plurality of rotating objects.

Another object of this invention is to provide an expandable electro-optical pickup unit in which the base separation of the sensor elements may be increased to precisely reposition the sensor elements thereby effecting an increase in the useful measurement range capability of the unit.

SUMMARY OF THE INVENTION

The above objects are achieved by a preferred embodiment of the present invention in which parallelogram type of hinges allow the light beam defining and sensor containing elements to be moved apart without changing their relative angular alignment. The hinges also act as a constraining force upon the sensor containing elements in their expanded position thereby assuring a rigidly aligned configuration of the pickup unit. Electrical interconnection is maintained by means of flexible ribbon type multiple conductors which are unrolled as the sensor elements are moved apart. The preferred embodiment envisions the sensor containing units being hinged to a base unit which is positioned remotely from the main body of the measuring instrument and attached thereto by means of a conventional cable. However, it is recognized that the sensor units may be hinged directly to the main body of the instrument.

DESCRIPTION OF THE DRAWING

Operation of the preferred embodiment of the invention may be better understood by reference to the accompanying drawing in which:

FIG. 1 is a perspective view of the inventive pickup unit in the closed position;

FIG. 2 is a perspective view showing the pickup unit of FIG. 1 partially expanded;

DESCRIPTION OF THE INVENTION

Figure 3:
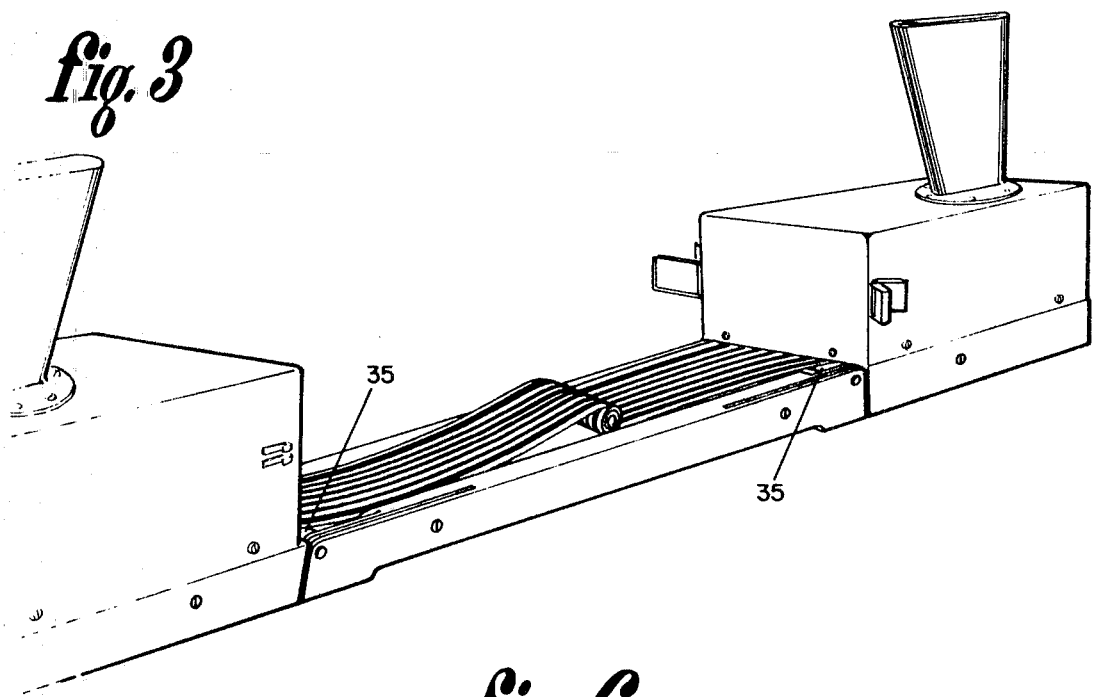
FIG. 3 is a perspective partial view showing the significant features of the unit of FIG. 1 in the fully expanded position.

The preferred embodiment of the invention is illustrated in FIGS. 1 through 3 wherein are shown successive stages of expansion of the pickup unit. The illustrated pickup unit comprises sensor containers 10 and 11 mounted upon base member 12. In operation, sensor containers 10 and 11 may occupy positions on base member 12 as shown in FIG. 1, which configuration will be referred to hereinafter as the closed position. Alternatively, containers 10 and 11 may be swung outwardly from their initial positions through the position shown in FIG. 2, coming finally to rest in the expanded position abutting base member 12 at each of its ends as shown in FIG. 3.

The expanded configuration provides an extension of the useful measurement range of the unit; that is, the distance at which an object can be accurately measured or detected. On the other hand, the closed position allows retention of the original minimum measurement distance. If at least one of the beam defining elements is variable in its angle of inclination, such as shown in the aforementioned U.S. Pat. No. 3,002,420, a continuous useful range of measurement can be obtained. A continuous range of measurement also can be obtained with fixed sensor elements, such as disclosed in U.S. Pat. No. 2,960,908; however, its usefulness in that case is severely limited by the practical limitations of accuracy inherent in the parallax angles of such a system.

Because the inventive unit is to function as a remotely located pickup, connector 13 is provided through which electrical connection can be made to a main computing and indicating unit, not shown, but which may be similar to that employed in U.S. Pat. No. 3,002,420. Visors 14 and 15 may be attached to sensor containers 10 and 11, respectively, to prevent extraneous radiation from reaching the sensor elements.

The principal components of the invention are illustrated in FIG. 2, which shows the pickup unit in the process of being expanded. Sensor container 10 is attached to base member 12 by means of parallel hinge arms 20 (one illustrated) which pivot on pins 21 through each end of each arm. Hinge arms 20 move in guide slots 22 in base member 12 and, as illustrated by FIGS. 1 and 3, are not readily visible when the pickup unit is either closed or fully expanded. Sensor container 11 is similarly connected to base member 12 by parallel hinge arms 25 (one illustrated) pivoting on pins 26 and moving in guide slots 27 (one slot illustrated). Similar guide slots allow clearance of the hinge arms in sensor containers 10 and 11, as illustrated by slots 28 in container 11. Advantageously guide slots 22, 27 and 28 help to maintain alignment between sensor containers 10 and 11 during and after expansion of the unit as well as providing for clearance for hinge arms 20 and 25.

To maintain alignment of the sensor elements and achieve proper operation, sensor containers 10 and 11 must retain the same relative orientation when the unit is expanded that they had when the unit was in the closed position. To accomplish this, a system of positive seating cooperates with the hinge arms and guide slots to position the sensor containers automatically when the unit is expanded. Machined surfaces 23 and 29 on sensor containers 10 and 11, respectively, mate with corresponding machined surfaces 24 and 30, respectively, on the ends of base member 12 when the unit is expanded. Being constrained by the hinge arms, these inclined mating surfaces fit together with a wedging action thereby assuring a positive positioning of the sensor containers. Thus, by its inventive construction the unit guarantees the proper final orientation of the sensor elements.

When the unit operates in the closed position, the sensor containers are held in position by latches 31 (one illustrated) on each side of the unit. These latches may be any one of a number of positive closure types such as are commonly found on carrying cases or band luggage. Advantageously, these latches also help prevent damage to the sensor elements by holding the sensor containers firmly in place during transportation of the unit.

Another inventive feature shown in FIG. 2 is the use of flexible electrical conductor 33 to maintain electrical interconnection of the sensors within containers 10 and 11. Preferably, flexible conductor 33 is of the flat ribbon type comprising a plurality of individual electrical conductors positioned upon a spring-like insulating substrate. Conductor 33 is advantageously formed of a continuous piece of the aforementioned ribbon which is coiled upon itself and adapted to uncoil and recoil respectively as the unit is expanded and closed. Clearance spaces 34 are provided in sensor containers 10 and 11 to accommodate conductor 33 when the unit is in the closed position.

Other advantageous features of the preferred inventive embodiment include cylindrical rod members 35, which may be used as carrying handles when the unit is in the closed position, as in FIG. 1. In addition, rod members 35 are finished to provide a smooth guide surface for conductor 33 when the unit is in the fully expanded position, as indicated in FIG. 3. Use of these guide surfaces prevents sharp bending of conductor 33 thereby avoiding possible damage thereto.

Figure 4:
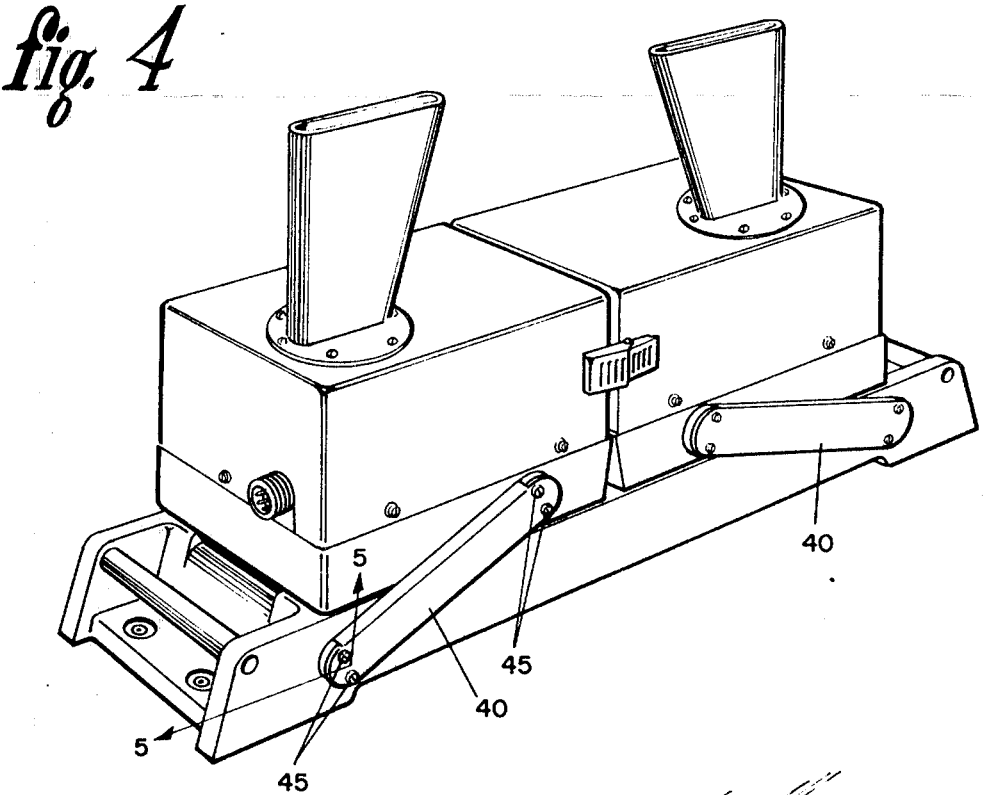
FIG. 4 is a perspective view of another embodiment of the inventive unit in the closed position illustrating an alternative hinge mechanism.
Figure 5:
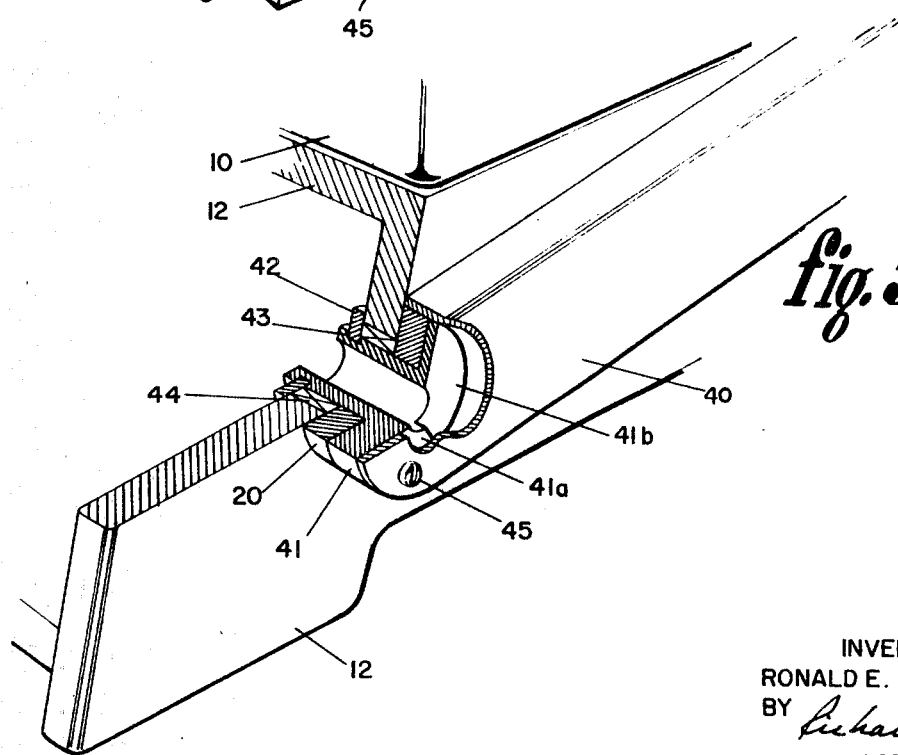
FIG. 5 is a partial section of the alternative hinge taken along the lines 5—5 in FIG. 4 and partially cut-away to show hinge pin details.

An alternate method of providing electrical interconnection between the sensor containers is illustrated in FIGS. 4 and 5. In this construction, the hinge arms are attached to the outsides of the base member and sensor containers rather than being enclosed in guide slots as before. Advantageously, the hinge assemblies may be concealed by hinge covers 40, which serve to provide a hollow channel for plural individual electrical conductors as well as protecting the hinge assemblies from dirt and other foreign substances. In addition, the base member may be of hollow construction also to provide an enclosed space for routing the plural conductors between the sensor container hinge arms.

Access for the electrical conductors from within the unit to the channel space under hinge covers 40 is provided by hollow hinge pins 41, which are best illustrated in FIG. 5. This partial view shows a cross section of a typical tubular hinge pin assembly. Hinge pin 41 passes through both hinge arm 20 and the side wall of base member 12 or one of the sensor containers 10 or 11, as the case may be, and is held in place by retaining ring 42 which fits in groove 43. Free rotation of the hinge assembly may be facilitated by bushing 44 in the side wall hole.

Hinge covers 40 are in the form of U-shaped channels totally enclosing the hinge arms except at their extreme ends where the sides of the channel are cut away leaving a flat portion conforming to the shape of the head of hinge pin 41 to which they are attached by means of screws 45.

As indicated in FIGS. 4 and 5, the head portions of hinge pins 41 serve to complete the enclosure of the hinge arms thereby forming a conduit for the electrical wires.

This interconnection of the sensor elements may be accomplished by means of conventional electrical wiring between sensor containers 10 and 11 routed by way of hollow hinge pins 41, the space under hinge covers 40, and the interior of base member 12. Advantageously, this path is of uniform length regardless of whether the unit is operating in the closed or expanded position.

As further indicated in FIG. 5, the head of hinge pin 41 does not have a uniform cross section. Part 41a of the head is thick to provide the necessary clearance between hinge 20 and hinge cover 40 for the electrical wiring and it is to this part that hinge cover 40 is fastened. A portion 41b of the head of hinge pin 41 must be cut down to provide passage for the electrical wiring. This cutdown portion of the head may range in size from a narrow slot to approximately half of the head. Those skilled in the art will perceive individual advantages accruing to various configurations within this range. Therefore, no particular size is set forth as preferred over any other in the illustrated embodiment of the invention.

A further advantageous feature of the illustrated inventive embodiment best shown in FIG. 2, is the placement of foot members 46. There are three of these feet, two placed on the near end of the unit as illustrated and one on the far end, thus assuring firm positioning of the unit upon any support surface. Preferably, these feet extend through flange 47 of base member 12 and are supported therein. In addition, each foot member 46 may be provided with a hole 48 through it. Holes 48 may or may not be threaded and serve as alignment aids in positioning the unit in a carrying case (not shown) by coacting with alignment pins therein. If threaded, holes 48 and said pins may be used to secure the unit within the carrying case.

Figure 6:
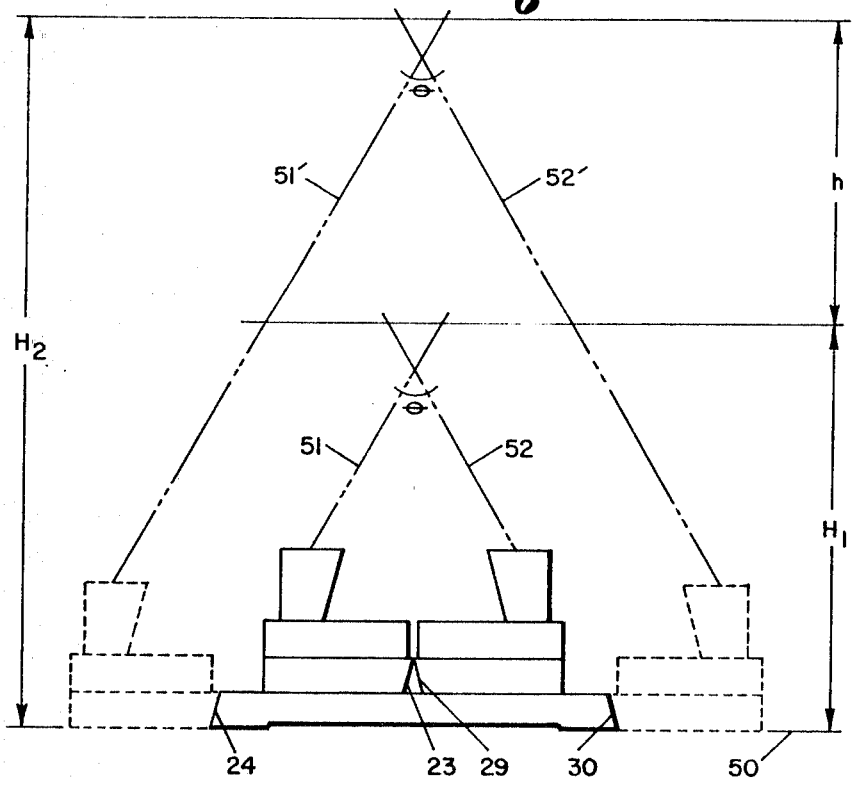
FIG. 6 is a schematic illustration of the improved operating capabilities attained by use of a pickup unit embodying the inventive construction.

The effects of changing the base length separation on the height measuring capability of the unit achieved by the use of the invention are illustrated in FIG. 6. As shown by the solid lines therein, the pickup unit is useful in its closed position to a maximum height, $H_1$, above datum plane 50, determined by the minimum included angle $\theta$ between the sensor beams 51 and 52. When expanded, as shown by the dashed lines, the unit is capable of operating to an increased maximum height, $H_2$, determined by the same minimum included angle $\theta$ between sensor beams 51' and 52'. The increase in useful height capability obtained by the expansion of the unit afforded by use of the inventive construction is shown as $h$, which represents the difference between $H_1$ and $H_2$. Because the pickup unit may be used in either the closed or expanded positions, this additional height capability is obtained without sacrificng any features of the closed unit.

FIG. 6 also clearly illustrates the importance of the positive seating of surfaces 23 and 29 upon surfaces 24 and 30, respectively. The automatic preservation of the relative orientation of sensor containers 10 and 11 thus provided assures that the angle $\theta$ will be obtained at the same point of beam inclination in both the closed and expanded positions because beams 51' and 52' are maintained parallel to beams 51 and 52, respectively.

Although the preferred embodiment of the invention has been illustrated and described herein, it is recognized that certain modifications thereof will become apparent to those skilled in the art. Therefore, it is understood that all such modifications are included as a part of this invention insofar as they fall within the scope of the appended claims.

I claim:
1. In a device for determining the spatial distance between a reference plane and each of a plurality of rotating objects, said device containing a plurality of light beam defining sensors, expandable sensor retaining means comprising:
   a base member, at least a portion of which is hollow;
   a container for each of said sensors mounted upon and connected to said base member;
   a parallel arm type linkage hinging at least one of said containers to said base member whereby said hinged container may be swung in a controlled manner between a closed position on top of said base member and an expanded position alongside of and abutting said base member without changing the angular orientation between said sensors; and
   flexible ribbon type multiple conductor electrical interconnecting means connected between said sensors, said interconnecting means connected between said sensors, said interconnecting means being formed into a roll and adapted to be uncoiled upon expansion of said sensor retaining means by operation of said parallel arm linkage.

2. Expandable sensor retaining means as set forth in claim 1 wherein said parallel arm linkage comprises:
   a pair of parallel hinge arms connecting said base member and said hinged container, each of said arms having a first end adjacent said base member and a second end extending alongside said hinged container; and
   four hollow pivot pins, one each connecting each of said first ends of said arms to said base member and one each connecting said second ends of said arms to said hinged container, said hollow pins being open ended thereby providing a means of communication into both said hinged container and the hollow portion of said base member.

3. Expandable sensor retaining means as set forth in claim 2 additionally comprising:
   a cover for each of said hinge arms, said cover being formed in the shape of a U-channel and attached to said hollow pivot pins at points adjacent to each end of said hinge arm thereby cooperating with said hollow pivot communicating between the interior of said hinged container and the hollow portion of said base member.

4. In a parallax interval sensing device having two sensor elements, an expandable electro-optical pickup unit comprising;
   a base member comprising two substantially identical generally trapezoidally shaped sides and a flange connected therebetween to maintain said two sides spaced apart parallel to each other with their respective top surfaces mutually coplanar and with their four non-parallel inclined end surfaces defining two inclined planes;
   a first sensor container having a bottom positioned upon said top surfaces of said sides and having at least a portion of one surface adjacent said bottom inclined at an angle adapted to mate with the non-parallel end surfaces of said sides that defines one of said inclined planes;
   a second sensor container having a bottom positioned upon said top surfaces of said sides adjacent said first sensor container, said second sensor container having at least a portion of one surface adjacent said bottom inclined at an angle adapted to mate with the non-parallel end surfaces of said sides that defines the second one of said inclined planes; and
   first and second parallel arm hinge means connecting said first and second sensor containers, respectively, to said base member, whereby said first and second sensor containers may be pivoted between their closed positions upon said top surfaces to expanded positions firmly abutting said base member so that the inclined surface on each of said sensor containers is wedgedly juxtaposed with its counterpart inclined end surfaces of said parallel sides.

5. An expandable electro-optical pickup unit as set forth in claim 4 wherein said first and second parallel arm hinge means comprises:
   said sides of said base member additonally each have guide slots cut into their top surfaces and extending through their inclined end surfaces;
   said first and second sensor containers additionally each have clearance slots in their inclined surface portions and adjacent bottoms, said clearance slots being aligned with said guide slots;
   first and second pairs of flat, generally rectangular hinge arms adapted to extend between said sensor containers and to fit freely into said aligned clearance and guide slots, each of said hinge arms having a hole therethrough near each end; and
   pivot pin means located one each through said holes in said hinge arms and anchored interior of the corresponding one of said slots, thereby providing a stationary pivot axle at each end of each arm while simultaneously retaining said arms in their respective slots whereby said arms are substantially invisible both when said sensor containers are in their closed positions and when said sensor containers are in their expanded positions.

References Cited
UNITED STATES PATENTS

| | | | |
|---|---|---|---|
| 441,975 | 12/1890 | Rapieff | 33—65 |
| 903,078 | 11/1908 | Gianini | 206—45.15 X |
| 2,548,590 | 4/1951 | Cook | 250—234 X |
| 3,002,420 | 11/1961 | Willits et al. | 250—214 X |

JAMES W. LAWRENCE, Primary Examiner

D. O'REILLY, Assistant Examiner

U.S. Cl. X.R.

356—4, 28